US009058270B2

(12) United States Patent
Cain, III et al.

(10) Patent No.: US 9,058,270 B2
(45) Date of Patent: Jun. 16, 2015

(54) FALSE SHARING DETECTION LOGIC FOR PERFORMANCE MONITORING

(75) Inventors: Harold W. Cain, III, Hartsdale, NY (US); Hubertus Franke, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1027 days.

(21) Appl. No.: 13/167,773

(22) Filed: Jun. 24, 2011

(65) Prior Publication Data

US 2012/0331233 A1 Dec. 27, 2012

(51) Int. Cl.
*G06F 12/00* (2006.01)
*G06F 12/08* (2006.01)

(52) U.S. Cl.
CPC .................................. *G06F 12/0815* (2013.01)

(58) Field of Classification Search
None
See application file for complete search history.

(56) References Cited

U.S. PATENT DOCUMENTS

| | | | | |
|---|---|---|---|---|
| 6,094,709 | A * | 7/2000 | Baylor et al. | 711/141 |
| 6,839,810 | B2 * | 1/2005 | Takahashi | 711/141 |
| 7,093,081 | B2 | 8/2006 | DeWitt, Jr. et al. | |
| 7,114,036 | B2 | 9/2006 | DeWitt, Jr. et al. | |
| 7,185,147 | B2 | 2/2007 | Illikkal et al. | |
| 7,853,752 | B1 * | 12/2010 | Agarwal et al. | 711/120 |
| 2003/0079085 | A1 * | 4/2003 | Ang | 711/122 |
| 2004/0199363 | A1 * | 10/2004 | Bohizic et al. | 702/186 |
| 2005/0111276 | A1 | 5/2005 | Bar et al. | |
| 2008/0282035 | A1 * | 11/2008 | Hundt et al. | 711/128 |
| 2009/0125465 | A1 | 5/2009 | Berg et al. | |
| 2012/0089785 | A1 * | 4/2012 | Cho et al. | 711/141 |
| 2012/0210073 | A1 * | 8/2012 | Eichenberger et al. | 711/146 |

FOREIGN PATENT DOCUMENTS

JP 2008176731 A 7/2008

OTHER PUBLICATIONS

Bernstein, David et al., "Solutions and debugging for data consistency in multiprocessors with noncoherent caches", International Journal of Parallel Programming, Abstract, vol. 23, No. 1, Feb. 1995, p. 83.
Huh, Jaehyuk et al., "Coherence Decoupling: Making Use of Incoherence", ASPLOS'04, Oct. 9-13, 2004, pp. 97-106.
Khera, Vivek, "Factors Affecting False Sharing on Page-Granularity Cache-Coherent Shared-Memory Multiprocessors", 56/03-B of Dissertation Abstracts International, p. 1539, Duke University, Dec. 1, 1994, 123 pages.
Kohli, Prince, "User-Level State Sharing in Distributed Systems (Shared Memory)", 57/07-B of Dissertation Abstracts International, p. 4517, Abstract, Georgia Institute of Technology, 1996, 2 pages.
Lee, Eun H. et al., "An efficient word unit cache coherence protocol eliminating false sharing", Journal of KISS(a), Computer Systems and Theory, Abstract, vol. 25, No. 6, Jun. 1998, 1 page.

* cited by examiner

*Primary Examiner* — Christopher D Birkhimer
(74) *Attorney, Agent, or Firm* — Francis Lammes; Stephen J. Walder, Jr.; Jennifer R. Davis

(57) ABSTRACT

A mechanism is provided for detecting false sharing misses. Responsive to performing either an eviction or an invalidation of a cache line in a cache memory of the data processing system, a determination is made as to whether there is an entry associated with the cache line in a false sharing detection table. Responsive to the entry associated with the cache line existing in the false sharing detection table, a determination is made as to whether an overlap field associated with the entry is set. Responsive to the overlap field failing to be set, identification is made that a false sharing coherence miss has occurred. A first signal is then sent to a performance monitoring unit indicating the false sharing coherence miss.

22 Claims, 4 Drawing Sheets

FALSE SHARING DETECTION LOGIC FOR PERFORMANCE MONITORING

BACKGROUND

The present application relates generally to an improved data processing apparatus and method and more specifically to mechanisms for detecting false sharing misses for use in a performance monitoring unit or other types of system optimization.

In shared memory multiprocessor systems, multiple software threads share data through reads and writes to shared memory locations. These systems usually include caches of memory locations local to each processor that are managed using invalidation-based cache coherence protocols, such that when a shared memory location is written by one processor, that shared memory location is removed ("invalidated") from the cache(s) of all other processors in the system. When those processors subsequently read or write the memory location, the memory access will cause a cache miss, leading to an additional latency penalty in order to retrieve the data from the cache that wrote the location. In some applications, these penalties may account for a significant fraction of execution time. In the literature, such cache misses are referred to as coherence misses or communication misses.

Cache coherence protocols operate at the granularity of a cache line, whose sizes range, for example, from 32 bytes to 256 bytes in most computer systems. Because of this coarse granularity, such coherence misses may occur even though two processors are not touching the same data. One processor may write a subset of a cache line and the other processor may access a mutually exclusive subset of that line. However, the second processor will still observe an additional latency penalty upon access. In the literature, these misses are referred to as "False Sharing Misses".

For software developers, it is useful to differentiate between coherence misses that are due to false sharing and coherence misses that are due to the true sharing of data. Each type of miss will lead to a different software optimization strategy to avoid such misses. Although performance monitoring units may be able to detect coherence misses, the same performance monitoring units in current state-of-the-art systems are not able to differentiate between false sharing and true sharing misses.

SUMMARY

In one illustrative embodiment, a method, in a data processing system, is provided for detecting false sharing misses. The illustrative embodiment determines whether there is an entry associated with the cache line in a false sharing detection table in response to performing either an eviction or an invalidation of a cache line in a cache memory of the data processing system. The illustrative embodiment determines whether an overlap field associated with the entry is set in response to the entry associated with the cache line existing in the false sharing detection table. The illustrative embodiment identifies that a false sharing coherence miss has occurred in response to the overlap field failing to be set. The illustrative embodiment then sends a first signal indicating the false sharing coherence miss to a performance monitoring unit.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for detecting false sharing misses for use in a performance monitoring unit or other types of system optimization. In one embodiment a cache is augmented with a structure referred to as a "false sharing detection table", which maintains metadata associated with cache lines that are being tracked for false sharing. The table is a tagged cache-like structure indexed by cache line physical addresses. Each table entry is allocated when a coherence miss is observed. A table entry is deallocated when the cache line that was brought in by the coherence miss is evicted or invalidated. In another embodiment, rather than allocating the entry on access to a cache line whose valid bit is 0 but whose tag matches, an entry could be allocated when a line is invalidated and the current version of data could be written to the table at that time. In yet another embodiment, rather than checking the difference bitmask field on each access, a second bitmask could be maintained indicating the portions of the line that are touched or accessed. On eviction, this second bitmask is compared to the difference bitmask field. This embodiment may be advantageous in multilevel cache hierarchies, where maintaining a detection table at the cache level may be undesirable.

Figure 1:
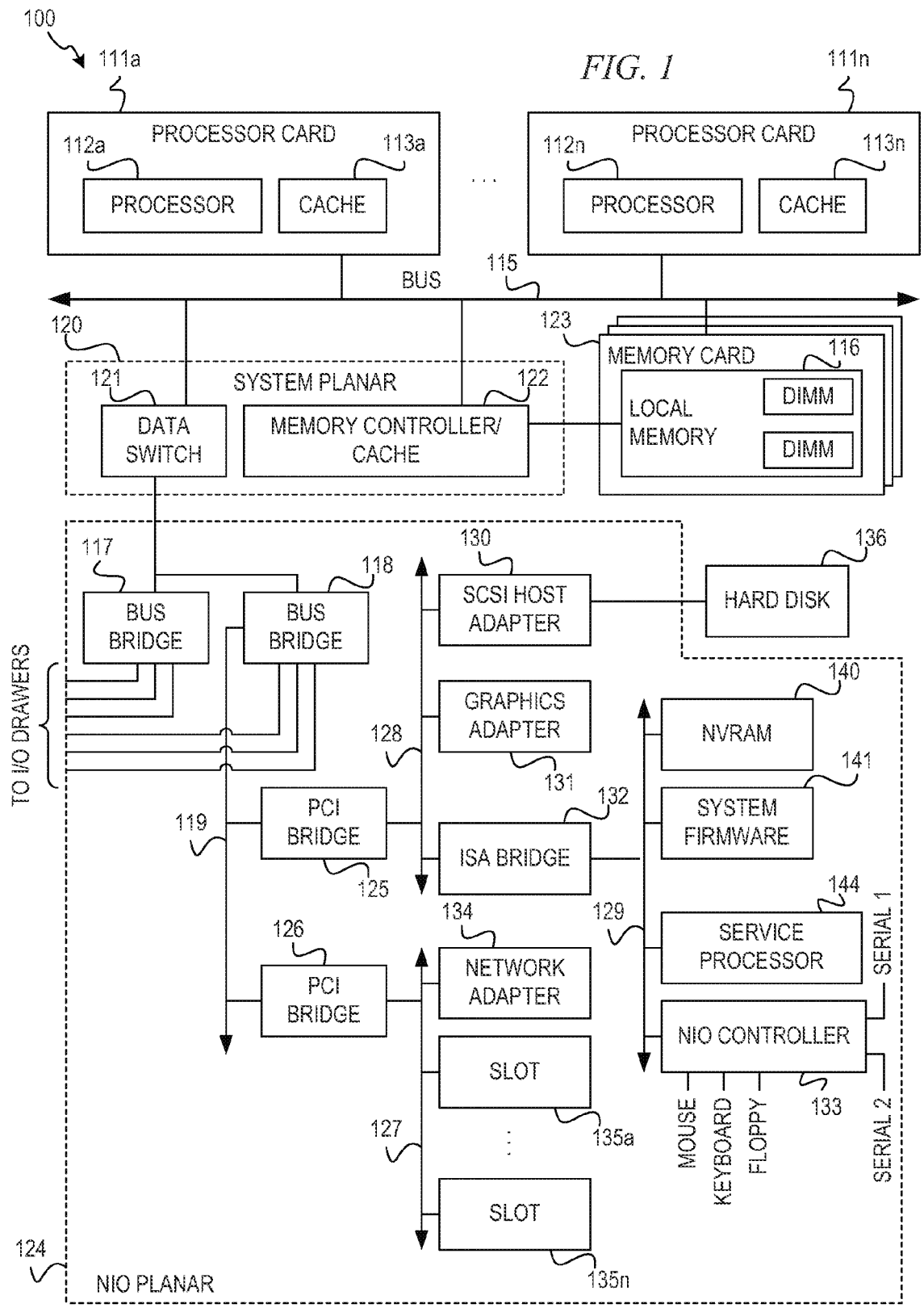
FIG. 1 depicts a block diagram of a data processing system with which aspects of the illustrative embodiments may advantageously be utilized.

Thus, the illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as an example environment in which aspects of the illustrative embodiments may be implemented. It should be appreciated that FIG. 1 is only one example and is not intended to assert or imply any limitation with regard to the environments in which aspects or embodiments of the present invention may be implemented. Many modifications to the depicted environments may be made without departing from the spirit and scope of the present invention.

Referring now to the drawings and in particular to FIG. 1, there is depicted a block diagram of a data processing system with which aspects of the illustrative embodiments may advantageously be utilized. As shown, data processing system 100 includes processor cards 111a-111n. Each of processor cards 111a-111n includes a processor and a cache memory. For example, processor card 111a contains processor 112a and cache memory 113a, and processor card 111n contains processor 112n and cache memory 113n.

Processor cards 111a-111n are connected to main bus 115. Main bus 115 supports a system planar 120 that contains processor cards 111a-111n and memory cards 123. The system planar also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a-135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140, which couples to ISA bus 129, provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Figure 2:
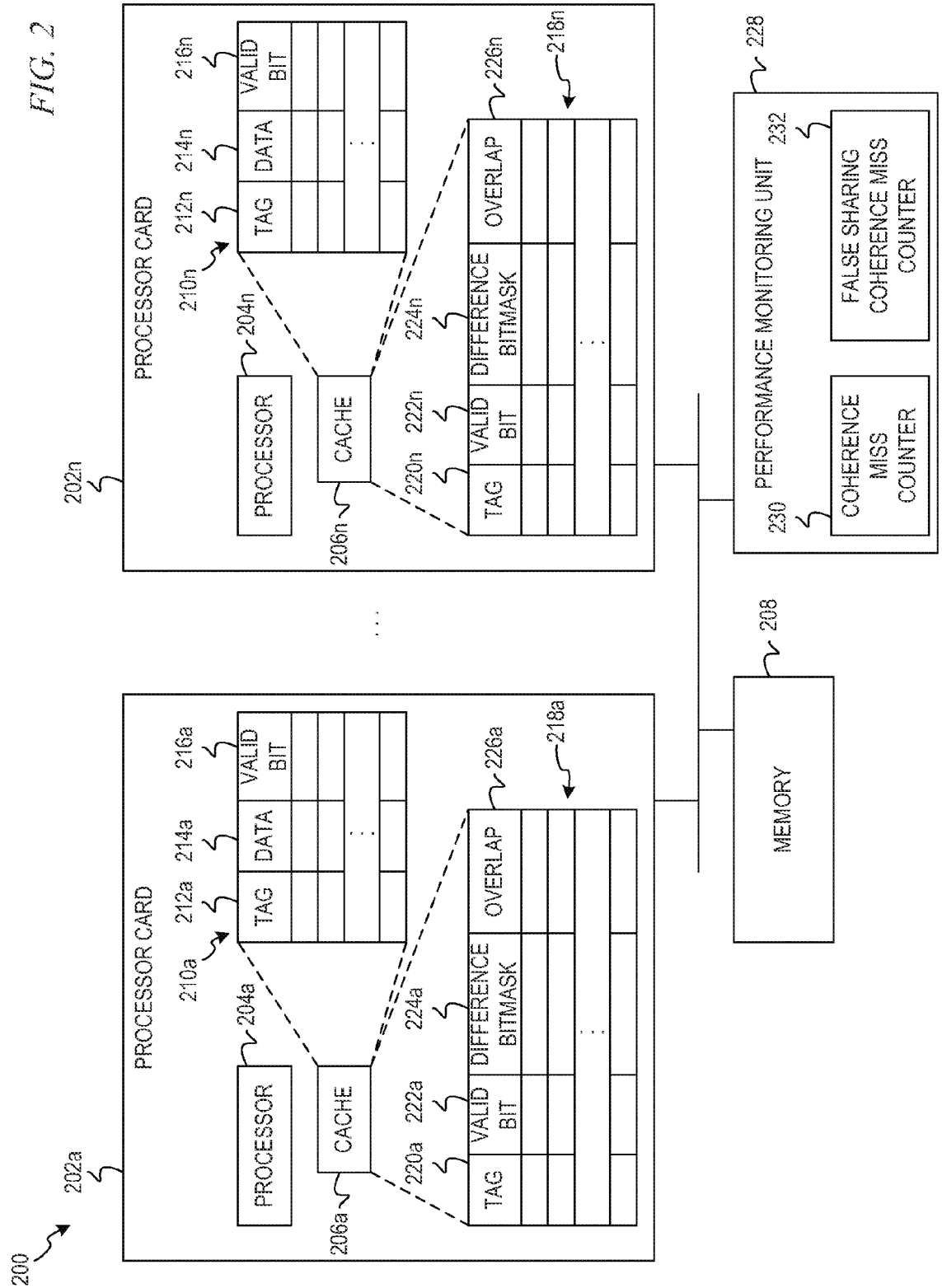
FIG. 2 depicts a functional block diagram of a mechanism for detecting false sharing misses for use in a performance monitoring unit or other types of system optimization in accordance with an illustrative embodiment.

FIG. 2 depicts a functional block diagram of a mechanism for detecting false sharing misses for use in a performance monitoring unit or other types of system optimization in accordance with an illustrative embodiment. Data processing system 200 comprises processor cards 202a-202n. Each of processor cards 202a-202n includes a processor and a cache memory. For example, processor card 202a contains processor 204a and cache memory 206a, and processor card 202n contains processor 204n and cache memory 206n.

When, for example, processor 204a needs to read or write a memory location in main memory 208, processor 204a first checks whether that memory location is in cache memory 206a. Processor 204a accomplishes this by comparing an address of the memory location to all tags in the cache that might contain that address. Cache table 210a provides one exemplary layout of cache memory 206a such that each cache entry includes tag 212a that contains a portion of the index of the data in main memory (referred to as an address), the data 214a that is associated with tag 212a, and a valid bit 216a that denotes whether the particular entry has valid data.

Similarly, when, for example, processor 204n needs to read or write a memory location in main memory 208, processor 204n first checks whether that memory location is in cache memory 206n. Processor 204n accomplishes this by comparing an address of the memory location to all tags in the cache that might contain that address. Cache table 210n provides one exemplary layout of cache memory 206n such that each cache entry is referenced by a tag 212n that contains a portion of the index of the data in main memory (referred to as an address), the data 214n that is associated with tag 212n, and a valid bit 216n that denotes whether the particular entry has valid data.

In order to detect false sharing, coherence misses that are candidates for false sharing tracking must first be detected. For example, when processor 204a accesses cache memory 206a, if a tag match occurs but the valid bit is not set, processor 204a identifies the match as a coherence miss such that the entry had been cache-resident until the entry was invalidated by some other processor, such as processor 204n. At this point, processor 204a allocates a new entry in false sharing detection table 218a. The entry in false sharing detection table 218a is referenced by a tag 220a that contains a portion of the index of the data in main memory (also referred to as an address) and a valid bit 222a that denotes whether the particular entry has valid data. Upon the detection of the coherence miss, processor 204a sets valid bit 222a associated with the entry. Processor 204a then performs a read of the data from memory 208.

When the data is retrieved from memory 208, processor 204a compares the retrieved data to the pre-existing cache contents for the invalid entry whose tag matched. From this comparison, processor 204a creates a bitmask of the bytes in the data that have changed since the line was last resident in cache table 210a, which may be referred to as a difference bitmask. In one illustrative embodiment, processor 204a performs a byte-granular comparison that results in a difference bitmask field containing a set bit per byte in the data cache line if there is a difference in that byte of data cache line and a not set bit if there is not a difference in that byte of the data cache line. In an alternate embodiment, processor 204a may perform a coarser comparison in order to reduce the size of the difference bitmask field. Processor 204a then stores the difference bitmask in a difference bitmask entry of false sharing detection table 218a associated with the data which is referenced by difference bitmask field 224a. After performing the comparison, processor 204a updates the data of the cache line in cache table 210a with the data read from memory 208 and sets the valid bit 216a of the entry.

Returning to the detection of false sharing, when processor 204a accesses cache memory 206a and no tag match occurs, then processor 204a recognizes a regular cache miss. Upon the detection of the regular cache miss, processor 204a performs a read of the data from memory 208. When the data is retrieved from memory 208, processor 204a writes the data as a new cache entry in cache table 210a with the data read from memory 208 along with the tag 212a that contains the index of the data in main memory (referred to as an address) and sets the valid bit 216a of the entry.

When processor 204a accesses cache memory 206a, a tag match occurs, and valid bit 216a is set, then processor 204a identifies a cache hit. In such an event, processor 204a also scans false sharing detection table 218a to determine whether a corresponding entry exists within false sharing detection table 218a. If processor 204a determines that a corresponding entry fails to exist within false sharing detection table 218a, the processor 204a processes the cache hit normally. However, if processor 204a determines that a corresponding entry exists within false sharing detection table 218a, then processor 204a determines whether the operation accesses one of the bytes or portions of the data cache line whose associated bit in difference bitmask field 224a is set indicating a difference in that byte of data cache line. If processor 204a determines that the bit corresponding to that byte of the data cache line is set in difference bitmask field 224a, then processor 204a recognizes that no false sharing has occurred because bytes changed by the other processor have been accessed by processor 204a. Detecting such a no false sharing event may be referred to as true sharing. In the event of no false sharing or true sharing, then processor 204a sets overlap field 226a of false sharing detection table 218a. If processor 204a determines that the bit corresponding to that byte of the data cache line is not set in difference bitmask field 224a, then processor 204a recognizes that the current access is not accessing a truly shared portion of the cache line. If processor 204a determines that the bit corresponding to that byte of the data cache line is not set in difference bitmask field 224a, the processor 204a processes the cache hit normally.

In order to provide a basis of the remaining embodiments, a clear understanding of eviction and invalidation is provided. During operation, when, for example, processor 204n accesses cache memory 206n for data that may also exist in cache memory 206a, then processor 204n sends a signal to processor 204a so that processor 204a may verify the existence of such data in cache memory 206a. If processor 204a determines that the data exists in cache memory 206a, then processor 204a resets valid bit 216a associated with the entry in cache table 210a, which indicates that the data is invalidated.

With regard to eviction, in order to make room for a new entry on a cache miss, it may be necessary to evict one of the existing entries in, for example, cache table 210a due to cache memory 206a being full. In order to evict an entry from cache table 210a, processor 204a may use a heuristic to choose the entry to evict, which may be referred to as a replacement policy. The fundamental problem with any replacement policy is that processor 204a must predict which existing cache entry is least likely to be used in the future. Predicting the future is difficult, especially for hardware caches that use simple rules amenable to implementation in circuitry, so there are a variety of replacement policies to choose from and no perfect way to decide among them. One popular replacement policy is to replace the least recently used (LRU) entry.

When processor 204a either evicts a cache line from or invalidates a cache line in cache memory 206a, processor 204a first determines whether there is an associated entry of the data in false sharing detection table 218a and then whether there is a state of overlap field 226a in false sharing detection table 218a. If processor 204a determines that an entry fails to exist in false sharing detection table 218a, then processor 204a proceeds with the invalidation or eviction. If processor 204a determines that an entry exists in false sharing detection table 218a and overlap field 226a is set, then processor 204a identifies that true sharing coherence miss has occurred. If processor 204a determines that an entry exists in false sharing detection table 218a and overlap field 226a is not set, then processor 204a identifies that false sharing coherence miss has occurred.

Upon detecting either a false sharing coherence miss or a true sharing coherence miss, processor 204a sends a respective signal to performance monitoring unit 228 where, upon receiving such a signal, performance monitoring unit 228 increments either one or two counters. The first counter, coherence miss counter 230, counts the number of coherence misses that were checked for false sharing and the second counter, false sharing coherence miss counter 232, counts the number of actual false sharing coherence misses. Thus, if a false sharing coherence miss is detected, then processor 204a sends a signal to performance monitoring unit 228, where, upon receiving such a signal, performance monitoring unit 228 increments both coherence miss counter 230 and false sharing coherence miss counter 232. If a true sharing coherence miss is detected, then processor 204a sends a signal to performance monitoring unit 228, where, upon receiving such a signal, performance monitoring unit 228 increments only coherence miss counter 230. Performance software of data processing system 200 periodically reads coherence miss counter 230 and false sharing coherence miss counter 232 in order to determine the extent of false sharing misses.

Performance analysts and software developers may then use this information to determine the fraction of cache misses caused by false sharing and true sharing, respectively. Such information may be used in numerous ways, such as if the fraction of cache misses caused by false sharing is high, then software developers may insert padding between different variables that are being falsely shared, forcing them to be located on different cache lines. If the percentage of true sharing misses is high, then depending on the type of access causing the miss, programmers may be able to reduce the number of misses through other types of optimizations, such as replacing a single counter with a distributed counter implementation. After signaling the performance monitoring unit 228, processor 204a proceeds with the invalidation or eviction as well as evicting the associated entry from false sharing detection table 218a.

In an alternative embodiment, rather than processor 204a allocating a new entry in false sharing detection table 218a when processor 204a accesses cache memory 206a and determines that a tag match occurs but the valid bit is not set, processor 204a may allocate the entry into false sharing detection table 218a when the entry in cache table 210a is invalidated. That is, when, for example, processor 204n accesses cache memory 206n for data that may also exists in cache memory 206a and processor 204n sends a signal to processor 204a, processor 204a determines whether the data exists in cache memory 206a. If the data exists in cache memory 206a, then processor 204a sets valid bit 216a associated with the entry in cache table 210a, which indicates that the data is invalidated. It would be at this point where processor 204a would allocate the entry into false sharing detection table 218a. This alternative embodiment provides an advantage in that a detection of coherence misses would not be susceptible to capacity eviction of the invalid line, which is susceptible to being reused in the interim between invalidation and coherence misses. However, a disadvantage of this alternative embodiment is increased occupancy in the false sharing detection table during this interim along with additional data fields in false sharing detection table 218a.

In a further alternative embodiment, rather than, when processor 204a accesses cache memory 206a, a tag match occurring, and valid bit 216a is set, and then processor 204a scanning false sharing detection table 218a to determine whether a corresponding entry exists within false sharing detection table 218a, a second bitmask (not shown) may be independently maintained by cache memory 206a that indicates the portions of the cache line that are touched or accessed while the cache line is resident in cache memory 206a. On eviction, processor 204a may compare the second bitmask to difference bitmask field 224a. This further alternative embodiment may be advantageous in multilevel cache hierarchies, where lookup of the detection table at every access to cache memory 206a may be undesirable, allowing the cache memory 206a to locally track accesses and later access the detection table entry on eviction from cache memory 206a, thereby reducing accesses to the detection table.

Processor 204n may perform similar processes with respect to false sharing detection table 218n, tag 220n, valid bit 222n, and overlap field 226n as is illustrated with regard to processor 204a above.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 3:
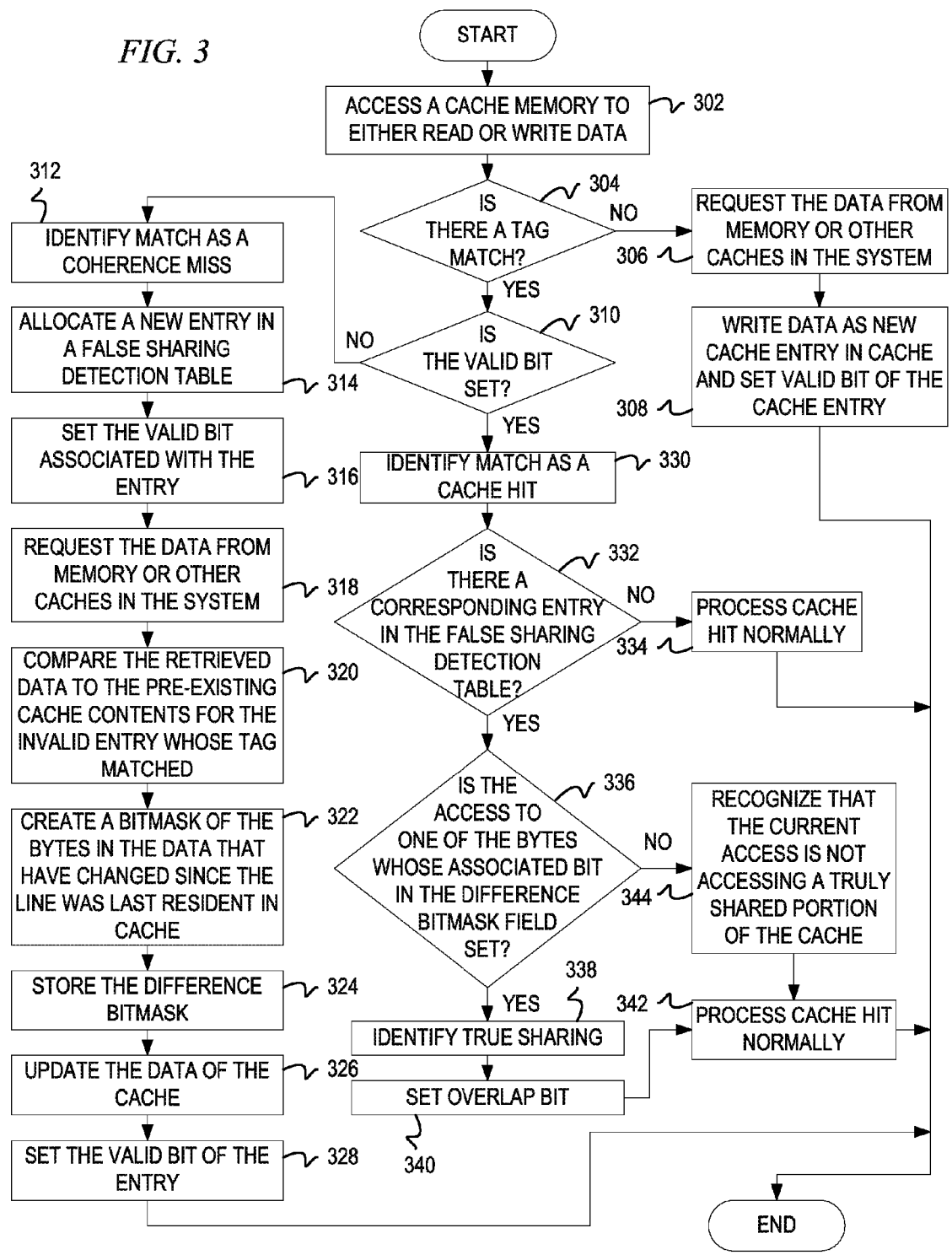
FIG. 3 depicts an exemplary flow diagram of the operation performed in detecting false sharing misses for use in a performance monitoring unit or other types of system optimization in accordance with an illustrative embodiment.

FIG. 3 depicts an exemplary flow diagram of the operation performed in detecting false sharing misses for use in a performance monitoring unit or other types of system optimization in accordance with an illustrative embodiment. As the operation begins, a processor accesses a cache memory to either read or write data (step 302) and determines whether a tag match occurs for the address of the data (step 304). If at step 304 a tag match fails to occur, then the processor recognizes the failure to match a tag as a cache miss and requests the data from memory or other caches in the system (step 306). When the data is retrieved, the processor writes the data as a new cache entry in a cache table of a cache memory along with a tag that contains the index of the data in main memory (referred to as an address) and sets the valid bit of the entry (step 308), with the operation ending thereafter.

If at step 304 a tag match occurs, then the processor determines whether the valid bit associated with the entry in the cache memory is set (step 310). If at step 310 the valid bit is not set, the processor identifies the match as a coherence miss such that the entry had been cache-resident until the entry was invalidated by some other processor (step 312). At this point, the processor allocates a new entry in a false sharing detection table (step 314). The entry in the false sharing detection table is referenced by a tag that contains the index of the data in main memory (also referred to as an address) and a valid bit that denotes whether the particular entry has valid data. Upon the detection of the coherence miss, the processor sets the valid bit associated with the entry (step 316) and requests the data from memory or other caches in the system (step 318).

When the data is retrieved, the processor compares the retrieved data to the pre-existing cache contents for the invalid entry whose tag matched (step 320). From this comparison, the processor creates a bitmask of the bytes in the data that have changed since the line was last resident in the cache table of the cache memory, which may be referred to as a difference bitmask (step 322). In one illustrative embodiment, the processor performs a byte-granular comparison that results in a difference bitmask field containing a set bit per byte in the data cache line if there is a difference in that byte of data cache line and a not set bit if there is not a difference in that byte of the data cache line. In an alternate embodiment, the processor may perform a coarser comparison in order to reduce the size of the difference bitmask field. In another alternate embodiment, the processor may compare a subset of bits in order to reduce the quantity of bits that are compared. The processor then stores the difference bitmask in a difference bitmask field entry of the false sharing detection table associated with the data (step 324). After performing the comparison, then the processor updates the data of the cache line in the cache table of the cache memory with the data read from memory (step 326) and sets the valid bit of the entry (step 328), with the operation ending thereafter.

Returning to step 310, if the valid bit is set, then the processor identifies a cache hit (step 330). The processor scans the false sharing detection table to determine whether a corresponding entry exists within the false sharing detection table (step 332). If at step 332 the processor determines that a corresponding entry fails to exist within false sharing detection table, then the processor processes the cache hit normally (step 334), with the operation ending thereafter. If at step 332 the processor determines that a corresponding entry exists within the false sharing detection table, then the processor determines whether the operation accesses one of the bytes or portions of the data cache line whose associated bit in the difference bitmask field is set indicating a difference in that byte of data cache line (step 336).

If at step 336 the processor determines that the bit corresponding to that byte of the data cache line is set in the difference bitmask field, then the processor recognizes that no false sharing (true sharing) has occurred because bytes changed by the other processor have been accessed by the processor (step 338). In the event of no false sharing or true sharing, then the processor sets an overlap field associated with the entry in the false sharing detection table (step 340). The processor then proceeds to process the cache hit normally (step 342), with the operation ending thereafter. If at step 336 the processor determines that the bit corresponding to that byte of the data cache line is not set in the difference bitmask field, then the processor recognizes that the current access is not accessing a truly shared portion of the cache line (step 344). If the processor determines that the bit corresponding to that byte of the data cache line is not set in the difference bitmask field, the processor processes the cache hit normally (step 342), with the operation ending thereafter.

Figure 4:
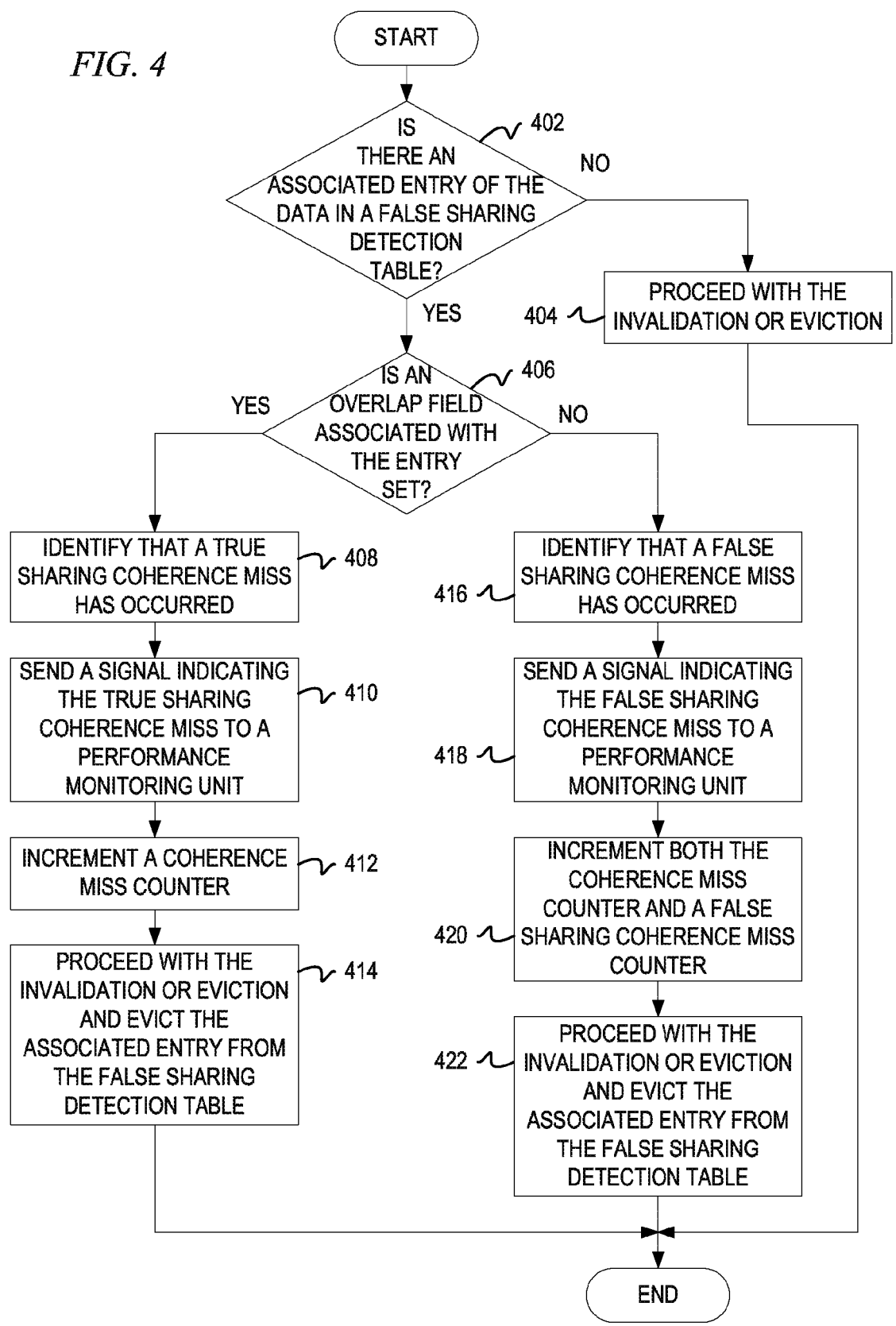
FIG. 4 depicts an exemplary flow diagram of the operation performed in reporting coherence misses and false sharing misses for use in a performance monitoring unit or other types of system optimization in accordance with an illustrative embodiment.

FIG. 4 depicts an exemplary flow diagram of the operation performed in reporting coherence misses and false sharing misses for use in a performance monitoring unit or other types of system optimization in accordance with an illustrative embodiment. The following operation is predicated on the determination by a processor that an eviction or invalidation needs to be performed in a cache memory. As the operation begins and an eviction or invalidation needs to be performed in a cache memory, the processor determines whether there is an associated entry of the data in a false sharing detection table (step 402). If at step 402 the processor determines that an entry fails to exist in the false sharing detection table, then the processor proceeds with the invalidation or eviction (step 404), with the operation ending thereafter.

If at step 402 the processor determines that an entry exists in the false sharing detection table, the processor determines whether an overlap field in the false sharing detection table associated with the entry is set (step 406). If at step 406 the processor determines that the overlap field associated with the entry is set, then the processor identifies that a true sharing coherence miss has occurred (step 408). The processor then sends a signal indicating the true sharing coherence miss to a performance monitoring unit (step 410). Upon receiving the true sharing coherence miss signal, the performance monitoring unit increments a coherence miss counter (step 412).

Performance analysts and software developers may then use this information to determine the fraction of cache misses caused by false sharing and true sharing, respectively. Such information may be used in numerous ways, such as if the fraction of cache misses caused by false sharing is high, then software developers may insert padding between different variables that are being falsely shared, forcing them to be located on different cache lines. If the percentage of true sharing misses is high, then depending on the type of access causing the miss, programmers may be able to reduce the number of misses through other types of optimizations, such as replacing a single counter with a distributed counter implementation. After signaling the performance monitoring unit, the processor proceeds with the invalidation or eviction as well as evicting the associated entry from the false sharing detection table (step 414), with the operation ending thereafter.

If at step 406 the processor determines that the overlap field associated with the entry is not set, then the processor identifies that a false sharing coherence miss has occurred (step 416). The processor sends a signal indicating the false sharing coherence miss to the performance monitoring unit (step 418). Upon receiving the false sharing coherence miss signal, the performance monitoring unit increments both the coherence miss counter and a false sharing coherence miss counter (step 420). Again, performance analysts and software developers may then use this information to determine the fraction of cache misses caused by false sharing and true sharing, respectively. After signaling the performance monitoring unit, the processor proceeds with the invalidation or eviction as well as evicting the associated entry from the false sharing detection table (step 422), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for detecting false sharing misses for use in a performance monitoring unit or other types of system optimization. In one embodiment a cache is augmented with a structure referred to as a "false sharing detection table", which maintains metadata associated with cache lines that are being tracked for false sharing. The table is a tagged cache-like structure indexed by cache line physical addresses. Each table entry is allocated when a coherence miss is observed. A table entry is deallocated when the cache line that was brought in by the coherence miss is evicted or invalidated. In another embodiment, rather than allocating the entry on access to a cache line whose valid bit is 0 but whose tag matches, an entry could be allocated when a line is invalidated and the current version of data could be written to the table at that time. In yet another embodiment, rather than checking the difference bitmask field on each access, a second bitmask could be maintained indicating the portions of the line that are touched or accessed. On eviction, this second bitmask is compared to the difference bitmask field. This embodiment may be advantageous in multilevel cache hierarchies, where maintaining a detection table at the cache level may be undesirable.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for detecting false sharing misses, the method comprising:
responsive to performing either an eviction or an invalidation of a cache line in a cache memory of the data processing system, determining, by a processor, whether there is an entry associated with the cache line in a false sharing detection table;
responsive to the entry associated with the cache line existing in the false sharing detection table, determining, by the processor, whether an overlap field associated with the entry is set;
responsive to the overlap field failing to set, identifying, by the processor, that a false sharing coherence miss has occurred; and
sending, by the processor, a first signal indicating the false sharing coherence miss to a performance monitoring unit.

2. The method of claim 1, further comprising:
incrementing, by the performance monitoring unit, a coherence miss counter and a false sharing coherence miss counter; and
either invalidating or evicting, by the processor, the cache line in the cache memory.

3. The method of claim 1, further comprising:
responsive to the overlap field being set, identifying, by the processor, that a true sharing coherence miss has occurred;
sending, by the processor, a second signal indicating the true sharing coherence miss to the performance monitoring unit;
incrementing, by the performance monitoring unit, a coherence miss counter; and
either invalidating or evicting, by the processor, the cache line in the cache memory.

4. The method of claim 1, wherein the overlap field becomes set by the method comprising:
   responsive to an operation to access the cache memory, determining, by the processor, whether a tag match occurs for the address of the data in the cache memory indicating a cache hit;
   responsive to the tag match occurring, determining, by the processor, whether a valid bit associated with the cache line in the cache memory is set;
   responsive to the valid bit associated with the cache line in the cache memory being set, determining, by the processor, whether a corresponding entry exists within the false sharing detection table;
   responsive to the corresponding entry existing within the false sharing detection table, determining, by the processor, whether the operation accesses one of a set of bytes of the cache line that has an associated bit in a difference bitmask field that is set indicating a difference in that byte of cache line;
   responsive to the operation accessing one of the set of bytes of the cache line that has the associated bit in the difference bitmask field that is set, identifying, by the processor, true sharing;
   setting, by the processor, the overlap field associated with the cache line in the false sharing detection table; and
   processing, by the processor, the cache hit normally.

5. The method of claim 4, further comprising:
   responsive to the operation accessing one of the set of bytes of the cache line that has the associated bit in the difference bitmask field that is not set, identifying, by the processor, false sharing; and
   processing, by the processor, the cache hit normally.

6. The method of claim 4, further comprising:
   responsive to the corresponding entry failing to exist within the false sharing detection table, processing, by the processor, the cache hit normally.

7. The method of claim 4, further comprising:
   responsive to performing the eviction of a cache line in the cache memory of the data processing system, comparing the difference bitmask field to a second bitmask field, wherein the second bitmask field indicates portions of the cache line that are accessed while the cache line is resident in the cache memory.

8. The method of claim 1, further comprising:
   responsive to an operation to access the cache memory, determining, by the processor, whether a tag match occurs for the address of the data in the cache memory indicating a cache hit;
   responsive to the tag match occurring, determining, by the processor, whether a valid bit associated with the cache line in the cache memory is set;
   responsive to the valid bit associated with the cache line in the cache memory failing to be set, identifying, by the processor, the tag match as a coherence miss;
   allocating, by the processor, a new entry in the false sharing detection table;
   setting, by the processor, a valid bit associated with the new entry;
   performing, by the processor, a read of data associated with the access from memory;
   comparing, by the processor, the data from memory to pre-existing cache contents for an invalid entry whose tag matched;
   creating, by the processor, the difference bitmask of the bytes in the data that have changed since the cache line was last resident in the cache memory;
   storing, by the processor, the difference bitmask in a difference bitmask field entry associated with the cache line in the false sharing detection table;
   updating, by the processor, the cache line in the cache memory with the data read from memory; and
   setting, by the processor, the valid bit of the cache line in the cache memory.

9. The method of claim 8, wherein the comparison is performed by either:
   a byte-granular comparison that results in the difference bitmask field containing a set bit per byte in the cache line if there is a difference in that byte of data cache line and a not set bit if there is not a difference in that byte of the data cache line,
   a subset of bits resulting in a partial difference bitmask, or
   across multiple bytes with a shortened difference bitmask containing one bit per unit of comparison.

10. The method of claim 1, further comprising:
    responsive to an operation to access the cache memory, determining, by the processor, whether a tag match occurs for the address of the data in the cache memory indicating a cache hit;
    responsive to the tag match occurring, determining, by the processor, whether a valid bit associated with the cache line in the cache memory is set;
    responsive to the cache line in the cache memory being invalidated, allocating, by the processor, a new entry in the false sharing detection table;
    setting, by the processor, a valid bit associated with the new entry;
    responsive to a subsequent request to cache line, reading, by the processor, of data associated with the access from memory;
    comparing, by the processor, the data from memory to pre-existing cache contents in the false sharing detection table entry;
    creating, by the processor, the difference bitmask of the bytes in the data that have changed since the cache line was last resident in the cache memory;
    storing, by the processor, the difference bitmask in a difference bitmask field entry associated with the cache line in the false sharing detection table;
    updating, by the processor, the cache line in the cache memory with the data read from memory; and
    setting, by the processor, the valid hit of the cache line in the cache memory.

11. A computer program product comprising a non-transitory computer readable storage medium having a computer readable program stored therein, wherein the computer readable program, when executed on a computing device, causes the computing device to:
    responsive to performing either an eviction or an invalidation of a cache line in a cache memory of a data processing system, determine whether there is an entry associated with the cache line in a false sharing detection table;
    responsive to the entry associated with the cache line existing in the false sharing detection table, determine whether an overlap field associated with the entry is set;
    responsive to the overlap field failing to set, identify that a false sharing coherence miss has occurred; and
    send a first signal indicating the false sharing coherence miss to a performance monitoring unit.

12. The computer program product of claim 11, wherein the computer readable program further causes the computing device to:
    increment a coherence miss counter and a false sharing coherence miss counter; and either invalidate or evict the cache line in the cache memory.

13. The computer program product of claim 11, wherein the computer readable program further causes the computing device to:
responsive to the overlap field being set, identify that a true sharing coherence miss has occurred;
send a second signal indicating the true sharing coherence miss to the performance monitoring unit;
increment a coherence miss counter; and
either invalidate or evict the cache line in the cache memory.

14. The computer program product of claim 11, wherein the overlap field becomes set by the computer readable program further causing the computing device to:
responsive to an operation to access the cache memory, determine whether a tag match occurs for the address of the data in the cache memory indicating a cache hit;
responsive to the tag match occurring, determine whether a valid bit associated with the cache line in the cache memory is set;
responsive to the valid bit associated with the cache line in the cache memory being set, determine whether a corresponding entry exists within the false sharing detection table;
responsive to the corresponding entry existing within the false sharing detection table, determine whether the operation accesses one of a set of bytes of the cache line that has an associated bit in a difference bitmask field that is set indicating a difference in that byte of cache line;
responsive to the operation accessing one of the set of bytes of the cache line that has the associated bit in the difference bitmask field that is set, identify true sharing;
set the overlap field associated with the cache line in the false sharing detection table; and
process the cache hit normally.

15. The computer program product of claim 14, wherein the computer readable program further causes the computing device to:
responsive to the operation accessing one of the set of bytes of the cache line that has the associated bit in the difference bitmask field that is not set, identify false sharing; and
process the cache hit normally.

16. The computer program product of claim 11, wherein the computer readable program further causes the computing device to:
responsive to an operation to access the cache memory, determine whether a tag match occurs for the address of the data in the cache memory indicating a cache hit;
responsive to the tag match occurring, determine whether a valid bit associated with the cache line in the cache memory is set;
responsive to the valid bit associated with the cache line in the cache memory failing to be set, identify the tag match as a coherence miss;
allocate a new entry in the false sharing detection table;
set a valid bit associated with the new entry;
perform a read of data associated with the access from memory;
compare the data from memory to pre-existing cache contents for an invalid entry whose tag matched;
create the difference bitmask of the bytes in the data that have changed since the cache line was last resident in the cache memory;
store the difference bitmask in a difference bitmask field entry associated with the cache line in the false sharing detection table;
update the cache line in the cache memory with the data read from memory; and
set the valid bit of the cache line in the cache memory.

17. An apparatus, comprising:
a processor; and
a memory coupled to the processor, wherein the memory comprises instructions which, when executed by the processor, cause the processor to:
responsive to performing either an eviction or an invalidation of a cache line in a cache memory of a data processing system, determine whether there is an entry associated with the cache line in a false sharing detection table;
responsive to the entry associated with the cache line existing in the false sharing detection table, determine whether an overlap field associated with the entry is set;
responsive to the overlap field failing to set, identify that a false sharing coherence miss has occurred; and
send a first signal indicating the false sharing coherence miss to a performance monitoring unit.

18. The apparatus of claim 17, wherein the instructions further cause processor to:
increment a coherence miss counter and a false sharing coherence miss counter; and
either invalidate or evict the cache line in the cache memory.

19. The apparatus of claim 17, wherein the instructions further cause the processor to:
responsive to the overlap field being set, identify that a true sharing coherence miss has occurred;
send a second signal indicating the true sharing coherence miss to the performance monitoring unit;
increment a coherence miss counter; and
either invalidate or evict the cache line in the cache memory.

20. The apparatus of claim 17, wherein the overlap field becomes set by the instructions further causing the processor to:
responsive to an operation to access the cache memory, determine whether a tag match occurs for the address of the data in the cache memory indicating a cache hit;
responsive to the tag match occurring, determine whether a valid bit associated with the cache line in the cache memory is set;
responsive to the valid bit associated with the cache line in the cache memory being set, determine whether a corresponding entry exists within the false sharing detection table;
responsive to the corresponding entry existing within the false sharing detection table, determine whether the operation accesses one of a set of bytes of the cache line that has an associated bit in a difference bitmask field that is set indicating a difference in that byte of cache line;
responsive to the operation accessing one of the set of bytes of the cache line that has the associated bit in the difference bitmask field that is set, identify true sharing;
set the overlap field associated with the cache line in the false sharing detection table; and
process the cache hit normally.

21. The apparatus of claim 20, wherein the instructions further cause the processor to:

responsive to the operation accessing one of the set of bytes of the cache line that has the associated bit in the difference bitmask field that is not set, identify false sharing; and process the cache hit normally.

22. The apparatus of claim 17, wherein the instructions further cause the processor to:

responsive to an operation to access the cache memory, determine whether a tag match occurs for the address of the data in the cache memory indicating a cache hit;

responsive to the tag match occurring, determine whether a valid bit associated with the cache line in the cache memory is set;

responsive to the valid bit associated with the cache line in the cache memory failing to be set, identify the tag match as a coherence miss;

allocate a new entry in the false sharing detection table;

set a valid bit associated with the new entry;

perform a read of data associated with the access from memory;

compare the data from memory to pre-existing cache contents for an invalid entry whose tag matched;

create the difference bitmask of the bytes in the data that have changed since the cache line was last resident in the cache memory;

store the difference bitmask in a difference bitmask field entry associated with the cache line in the false sharing detection table;

update the cache line in the cache memory with the data read from memory; and set the valid bit of the cache line in the cache memory.

\* \* \* \* \*